(12) United States Patent

Stedman et al.

(10) Patent No.: US 8,848,028 B2
(45) Date of Patent: Sep. 30, 2014

(54) AUDIO CUES FOR MULTI-PARTY VIDEOCONFERENCING ON AN INFORMATION HANDLING SYSTEM

(75) Inventors: Roy Stedman, Austin, TX (US); Carlton Andrews, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 704 days.

(21) Appl. No.: 12/911,349

(22) Filed: Oct. 25, 2010

(65) Prior Publication Data

US 2012/0098921 A1    Apr. 26, 2012

(51) Int. Cl.
*H04N 7/15* (2006.01)
*H04M 3/56* (2006.01)

(52) U.S. Cl.
CPC ............ *H04N 7/15* (2013.01); *H04M 2201/38* (2013.01); *H04M 3/567* (2013.01); *H04M 3/568* (2013.01)
USPC ..................................................... 348/14.12

(58) Field of Classification Search
USPC .................. 348/14.01, 14.07, 14.08, 14.02
See application file for complete search history.

(56) References Cited

U.S. PATENT DOCUMENTS

| | | | |
|---|---|---|---|
| 6,583,806 B2 * | 6/2003 | Ludwig et al. | 348/14.08 |
| 6,973,184 B1 | 12/2005 | Shaffer et al. | |
| 7,185,054 B1 | 2/2007 | Ludwig et al. | |
| 8,164,618 B2 * | 4/2012 | Yang et al. | 348/14.09 |
| 2003/0067535 A1 * | 4/2003 | Creed et al. | 348/14.04 |
| 2010/0328423 A1 * | 12/2010 | Etter | 348/14.16 |
| 2011/0026745 A1 * | 2/2011 | Said et al. | 381/310 |
| 2012/0050454 A1 * | 3/2012 | Eisenberg et al. | 348/14.09 |

* cited by examiner

*Primary Examiner* — Duc Nguyen
*Assistant Examiner* — Theodore Ndje
(74) *Attorney, Agent, or Firm* — Terrile, Cannatti, Chambers & Holland, LLP; Robert W. Holland

(57) ABSTRACT

Stereo audio cues are provided at an information handling system to associate audio with its source based upon the characteristics of the image of the source as presented at a display of the information handling system. For example, in one embodiment, a location on a display of a window having a videoconferencing participant is used to create a stereo audio location that correlates audio associated with the participant to the window location. In another embodiment, the size on a display of a window having a videoconferencing participant is used to determine the volume of audio that is associated with the participant.

20 Claims, 2 Drawing Sheets

AUDIO CUES FOR MULTI-PARTY VIDEOCONFERENCING ON AN INFORMATION HANDLING SYSTEM

BACKGROUND OF THE INVENTION

1. Field of the Invention

The present invention relates in general to the field of information handling system videoconferencing, and more particularly to cues for multi-party videoconferencing on an information handling system.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Increases in processing power on information handling systems to process information and increases in network bandwidth for communicating information have resulted in greater adoption of video conferencing by information handling system end users. For example, an end user with a portable information handling system and a broadband Internet interface can hold a face-to-face business meeting from virtually any location. Videoconferencing capabilities continue to expand as videoconferencing application designers take advantage of powerful processing and network resources to send higher quality images and sounds. Unified Communication software, such as Microsoft LYNC, Live Meeting and Skype, have begun to add multiparty support that allows several individual users in different locations to combine into a common videoconference with each participant having a video screen of the other participants. A recent beta videoconferencing application by Skype provides five-way videoconferences in which each user of a five-way videoconference sees a video presence, icon or still picture representing the other four parties.

One difficulty that arises with multi-party videoconferencing is identifying a current speaker in a videoconference. If the participants all know each other, then the differing sound of each voice provides a basis for identifying a speaker; however in situations where the participants are not familiar with each other, confusion can result as a greater number of participants speak up. More expensive proprietary videoconferencing systems, such as Cisco's Telepresence and HP Halo, use multichannel audio to create sound fields in the transmit and receive side of a videoconference, however these techniques typically require multiple microphones and some expertise to use. Some multi-party video telepresence applications, such as MingleVerse, provide virtual 3d chat rooms where end users move their own icon or avatar to join conversations with other participants. One technique that helps videoconferencing participants to identify a speaker in less complex Unified Communication applications is enlarging or otherwise highlighting the image or avatar of a speaker. Although this identifies the speaker, an end user must be viewing the videoconference screen to receive this cue or otherwise rely upon voice sound recognition to follow who is speaking.

SUMMARY OF THE INVENTION

Therefore a need has arisen for a system and method which provides audio cues for speaker recognition in a multiparty videoconference.

In accordance with the present invention, a system and method are provided which substantially reduce the disadvantages and problems associated with previous methods and systems for providing cues to identify a speaker in a multi-party videoconference. Audio information presented as audio sounds at an information handling system is adjusted based upon display characteristics of visual information associated with the audio information to provide cues regarding the visual information, such as the identity of visual information that is associated with the audio information.

More specifically, an information handling system interfaces through a network with other information handling systems to establish a multi-party videoconference that presents two or more video conference participants at an end user information handling system. Video information for each participant is presented as a visual image in a window at a display of the information handling system, with each window having a window characteristic. Speakers of the information handling system present the audio information associated with each window as audio sounds that are adjusted based upon the display characteristics. For example, a display position of a window relative to the center of the display is used to determine a stereo position from which the audio sounds appear to originate with the stereo position displaced from a center position in front of the display in proportion to the display window location displacement from the center of the display. As another example, the volume of audio sounds associated with a window is set based upon the size of the window. In order to adjust a stereo location or volume, an end user adjusts the window characteristics, such as by moving the window or increasing the window size.

The present invention provides a number of important technical advantages. One example of an important technical advantage is that convenient and natural audio cues are created at a videoconference endpoint so that an end user of the end point better understands which participant of the videoconference is speaking without having to view the videoconference. Creating a stereo audio effect with voice information of a videoconference based upon the location of the speaker's image on the videoconference display provides an audio cue of speaker identity that remains consistent based upon a view by an end user of the videoconference display. An end user can arrange videoconferencing participant images at the display to create a stereo effect that makes sense to the end user. Alternatively, an end user can adjust the size or shape of a videoconferencing participant image to create audio cues, such as by increasing the size of a videoconferencing participant image to increase the sound of the voice associated with the image.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Audio cues generated in stereo from visual characteristics of images presented at an information handling display help a videoconference participant to identify who is speaking in a video conference having multiple participants. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
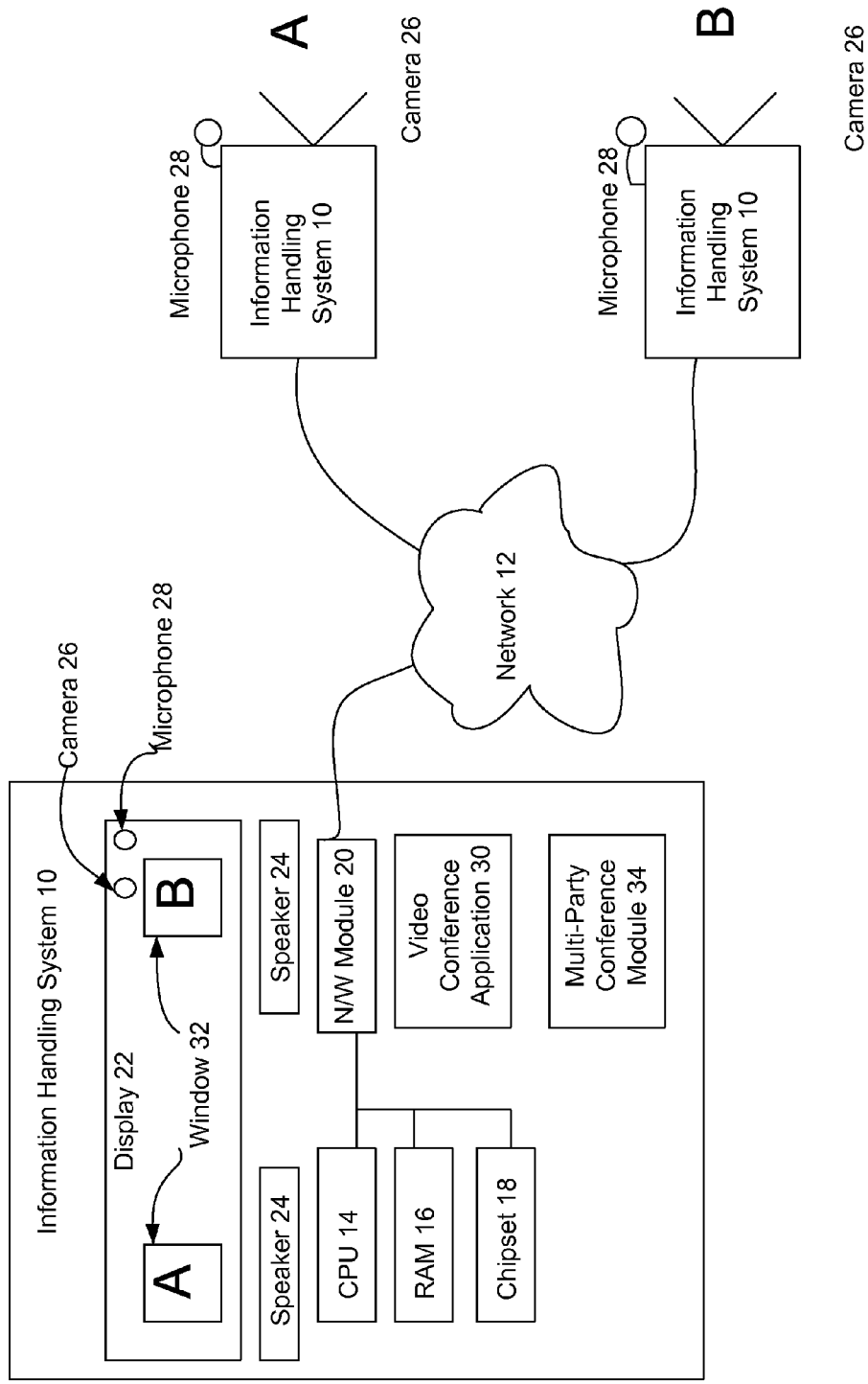
FIG. 1 depicts a block diagram of a multi-party videoconference that presents audio of participants with stereo cues based upon visual characteristics of images presented of the participants.

Referring now to FIG. 1, a block diagram depicts a multi-party videoconference that presents audio of participants with stereo cues based upon visual characteristics of images presented of the participants. In the example embodiment depicted by FIG. 1, plural information handling systems 10 communicate through a network 12, such as the Internet, so that a videoconference is established with plural participants presented at each information handling system 10. Information handling system 10 has plural processing components that cooperate to process information, such as a CPU 14, RAM 16, a chipset 18 and a network module 20 that supports network communication. A display 22, such as a liquid crystal display (LCD), presents information as visual images and speakers 24 present information as audio sounds. A camera 26 captures visual information for use by the processing components and a microphone 28 captures audio information for use by the processing components. For example, a video conferencing application stored in RAM 16 or other machine readable medium receives visual information from camera 26 and audio information from microphone 28 and process the visual and audio information for communication through network 12 to other information handling systems 10 for processing as a videoconference. Video conference application 30 receives videoconference information from network 12 through network module 20 and presents the videoconference information and visual images and audio sound at information handling system 10. In the example embodiment depicted by FIG. 1, participant A is presented in a first window 32 or other display space as an image A and participant B is presented in a second window 32 or other display space as an image B. The images A and B can include video images, a still picture or an avatar, depending upon the capability of the information handling system 10 sending the videoconference information.

A multi-party conferencing module 34 associated with video conference application 30 process videoconference information received from network 12 in order to provide audio cues to a videoconference end user that help identify a speaker of a video conference. Multi-party conference module 34 analyzes display space characteristics of the participants A and B as presented at display 22 and applies the display space characteristics to adjust audio of participants A and B as presented by speakers 24 to provide cues that associate the audio with the image of the participant. For example, multi-party conference module 34 applies the position of the window 32 in display 22 that is associated with each participant A and B to alter audio so that the audio sounds as if it originates from a position that correlates to the position of the associated window 32 on display 22. In the example embodiment depicted by FIG. 1, a window 32 presents participant A on the left side of display 22 and a second window 32 presents participant B on the right side of the display 22. Multi-party conferencing module 34 alters audio characteristics of participant A so that the audio sounds of participant A presented by speakers 24 seem to originate to the left of information handling system 10. Multi-party conferencing module 34 alters audio characteristics of participant B so that the audio sounds of participant B presented by speakers 24 seem to originate to the right of information handling system 10. In one embodiment, audio information received by video conferencing application 30 is monoaural and is altered to have a stereo image with a stereo position that correlates to the position of the window 32 in display 22 that originates the audio information. Network address information differentiates the audio associated with each participant to help create the stereo position correlating to the display position.

Although the example embodiment depicted by FIG. 1 applies display space characteristics of videoconference participants to alter audio characteristics of the participant, in alternative embodiments other types of information may be used. For example, an end user can vary the audio presented by speakers 24 for any number of applications that have visual information presented at display 22. In one example embodiment, an end user can adjust the volume of a music application by changing the size of the window that presents visual information for the music application with an increase in window size increasing music volume and a decrease in window size decreasing volume. For example, in one embodiment of a multi-party videoconference, an end user places his boss in a large screen in the middle of the display so that audio of the boss is prominently played at a relatively high volume. Other participants of the video conference are displaced from the center of the display so that audio of the other participants has an off-center stereo location to help identify and differentiate sounds made by the other participants. The size of the window presenting each of the other participants sets the volume at which their sounds are presented. In the background, the end user plays music with its volume set by its window size. The end user can quickly adjust the audio output of any window by changing the window characteristics of the window associated with the audio output, such as by moving the location of the window on the display or changing the size of the window.

Figure 2:
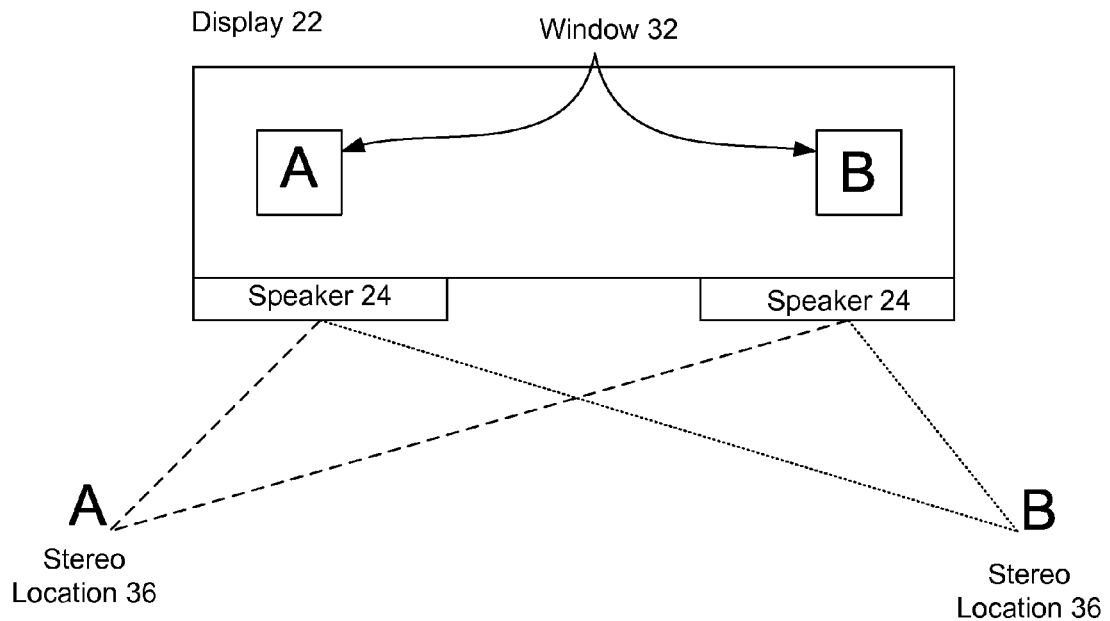
FIG. 2 depicts one example of stereo audio cues for each of plural videoconference participants determined based upon the location of presentation of visual images of the participants at a display.

Referring now to FIG. 2, one example of stereo audio cues is depicted for each of plural videoconference participants determined based upon the location of presentation of visual images of the participants at a display. A participant A is presented in a window 32 on the left side of display 22, and a participant B is presented in a window 32 on the right side of the display 22. Audio information that originates from the same network address as the visual information presented in the window 32 of participant A is processed for presentation by speakers 24 to sound as if the audio sounds originate at a stereo location A 36 located to the left of display 22. For example, the audio sounds for participant A that are generated at the left speaker 24 are louder than those generated at the right speaker to create a stereo effect. Similarly, audio information that originates from the same network address as the visual information presented in window 32 of participant B is processed for presentation by speakers 24 to sound as if the audio sounds originate at a stereo location B 36 located to the right of display 22. In one embodiment, stereo location 36 is proportional to the offset of an associated window 32 relative to a center location of display 22. Multi-party configuration module 34 allows an end user to adjust the relative impact of the location window 32 upon the associated stereo location 36.

Figure 3:
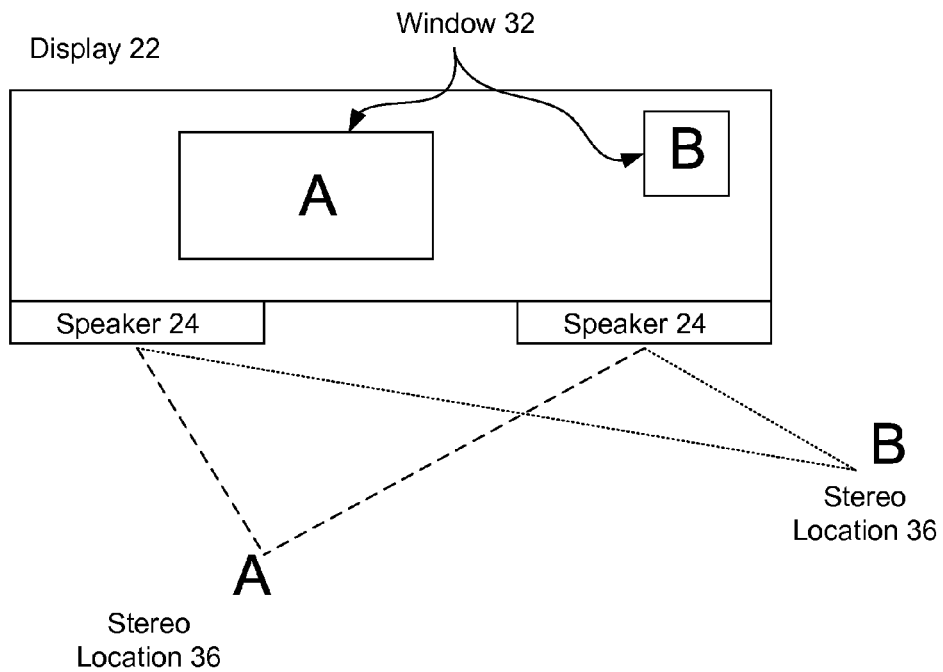
FIG. 3 depicts an example of changes made to stereo audio cues of videoconference participants in response to changes in the presentation of visual images of the participants.

Referring now to FIG. 3, an example is depicted of changes made to stereo audio cues of videoconference participants in response to changes in the presentation of visual images of the participants. The stereo location of participant A has shifted to a more central location relative to display 22 in response to movement of the window 32 that presents participant A to a more central location of display 22. The volume of audio sounds associated with participant A is increased in response to the increase of the size of the window 32 that presents the image of participant A. The stereo location of participant B has shifted to a more distant and right position relative to display 22 in response to the movement of window 32 having the image of participant B to a position at the top right of display 22. The volume of audio sounds associated with participant B is decreased in response to the decrease in the size of the window 32 that presents the image of participant B.

In alternative embodiments, alternative multichannel audio characteristics may be created with additional speakers 24 that use multichannel audio to create multi-dimensional effects for the audio sounds presented relative to display 22. A multi-dimensional characteristic is generated by presenting audio sounds from each of plural speakers in a different manner so that a voice of a participant seems to come from a voice origination location associated with the position of the participant on a display. Monoaural voice information is presented at the speakers to have a multi-dimensional effect with the multi-dimensional effect created based upon participant display location. For example, a portable information handling system display that has four speakers with one speaker at each corner of the display creates audio cues using all four speakers for greater flexibility in the multi-dimensional location of each participant. For instance, a videoconference with four participants having a participant presented in each of four corners of the display will have a voice origination location of each participant also associated with each corner of the display. In alternative embodiments, stereo or multi-dimensional locations may be further adjusted by the position of external peripheral speakers interfaced with the information handling system.

Although the present invention has been described in detail, it should be understood that various changes, substitutions and alterations can be made hereto without departing from the spirit and scope of the invention as defined by the appended claims.

What is claimed is:

1. An information handling system comprising:
a processor operable to execute an application;
memory interfaced with the processor and operable to store information associated with execution of the application;
a display operable to present visual information as images;
plural speakers operable present audio information as sounds;
a network module interfaced with the processor and operable to support communication over a network with plural network locations, each network location having a network address;
a video conferencing application operable present videoconferencing information as images at the display and sounds at the speaker; and
a multi-party conferencing module associated with the video conferencing application and operable to present visual information of each of plural videoconferencing participants as a visual image in an associated display space, each display space having a display location on the display, and to present audio information for each video conferencing participant as a sound having a stereo characteristic based upon the display location of the associated video conferencing participant visual image, the audio information received as monoaural information and altered to have the stereo characteristic by associating network address information of the audio information with network address information of visual information presented in each display space.

2. The information handling system of claim 1 wherein the stereo characteristic comprises a different volume at each of the plural speakers.

3. The information handling system of claim 2 wherein the different volume comprises a louder volume at a first of the plural speakers having a closer proximity to the display space than a second of the plural speakers.

4. The information handling system of claim 1 wherein the display space comprises a window.

5. The information handling system of claim 4 wherein the multi-conferencing module is further operable to detect movement of a window at the display and to adjust the stereo characteristic according to the movement.

6. The information handling system of claim 4 wherein the multi-party conferencing module is further operable to present audio information sound volume according to the size of the window having visual information associated with the audio information.

7. The information handling system of claim 6 wherein the multi-party conferencing module is further operable to detect an increase in the size of a window and to increase the sound volume of audio information associated with the window in response to the detecting.

8. The information handling system of claim 1 wherein the stereo speakers are capable of multiple axis of audio spatial positioning and the multi-party conferencing module is further operable to present multiple videoconference participants, each videoconference participant associated with a position, the multichannel audio characteristic comprising a voice origination location for each participant, the voice origination location of each participant proximate the position of the display associated with each participant.

9. A method for presenting a video conference at an information handling system, the video conference having plural participants, the method comprising:
  presenting an image of a first participant at a display in a first window having a first window characteristic, the first image associated with a first network address and having associated monoaural audio information;
  presenting an image of a second participant at the display in a second window having a second window characteristic, the second image associated with a second network address and having associated monoaural audio information;
  presenting audio of the first participant at one or more speakers, the audio information altered to have a first stereo audio characteristic based upon the first window characteristic, the stereo audio characteristic applied to audio information by association of network address information of the monoaural audio information with the first network address of the first image; and
  presenting audio of the second participant at the one or more speakers, the monoaural audio information altered to have a second stereo audio characteristic based upon the second window characteristic, the stereo audio characteristic applied to audio information by association of network address information of the monoaural audio information with the second network address of the second image.

10. The method of claim 9 wherein the first and second window characteristics comprise window location and the first and second audio characteristics comprise a stereo location positioned according to the window location.

11. The method of claim 10 wherein the first window location is positioned to the right of the second window location and the first audio has a stereo location to the right of the second audio stereo location.

12. The method of claim 10 further comprising:
  moving the first window location relative to the second window location by a predetermined distance and in a predetermined direction; and
  moving the first stereo location relative to the second stereo location according to the predetermined distance and predetermined direction.

13. The method of claim 10 wherein the image of the first participant comprises a video image sent to the information handling system through a network.

14. The method of claim 10 wherein the image of the first participant comprises a still image and the audio of the first participant comprises audio information sent to the information handling system through a network.

15. The method of claim 9 wherein the first and second window characteristics comprise a first and second window size and the first and second audio characteristics comprise a first and second volume according to the first and second window size.

16. The method of claim 15 further comprising:
  increasing the size of the first window relative to the second window; and
  increasing the volume of audio associated with the first window in response to the increasing the size.

17. A system for presenting a videoconference having plural participants, the system comprising:
  a non-transitory machine readable medium storing:
  a videoconferencing application operable to present a first image of a first participant at a display in a first window, a second image of a second participant at the display in a second window, a first audio of the first participant at one or more speakers, and a second audio of the second participant at the one or more speakers; and
  a multiparty conferencing module operable to determine a characteristic of the first window and to alter the first audio in response to the characteristic, the multiparty conferencing module identifying audio as the first audio by associating a network address of audio with a network address of the first image in the first window;
  wherein the audio is received as monoaural information and altered to have a stereo characteristic by associating network address information of the audio with network address information of visual information presented in the window.

18. The system of claim 17 wherein the characteristic comprises a location of the first window on the display, the multiparty conferencing module altering the first audio by presenting the first audio at a stereo location associated with the location of the first window on the display.

19. The system of claim 18 wherein the multiparty conferencing module is further operable to detect movement of the first window from the first location to a second location and to alter the first audio in response to detecting movement by presenting the first audio at a stereo location associated with the location of the first window second location.

20. The system of claim 17 wherein the characteristic comprises a size of the first window on the display, the multiparty conferencing module altering the first audio by presenting the first audio at a volume associated with the size of the first window on the display.

* * * * *